US008523019B2

(12) United States Patent
Drobot et al.

(10) Patent No.: US 8,523,019 B2
(45) Date of Patent: Sep. 3, 2013

(54) COMBINATION AERATOR, POURER, PRESERVER, AND STOPPER FOR A CONTAINER

(76) Inventors: Michael J. Drobot, Calgary (CA); Adam Balogh, North York (CA)

(*) Notice: Subject to any disclaimer, the term of this patent is extended or adjusted under 35 U.S.C. 154(b) by 18 days.

(21) Appl. No.: 13/328,110

(22) Filed: Dec. 16, 2011

(65) Prior Publication Data

US 2013/0153685 A1 Jun. 20, 2013

(51) Int. Cl.

| | |
|---|---|
| ***B67D 7/76*** | (2010.01) |
| ***B67D 1/08*** | (2006.01) |
| ***B67D 3/00*** | (2006.01) |
| ***B65D 5/72*** | (2006.01) |
| ***B65D 25/40*** | (2006.01) |
| ***B65D 35/38*** | (2006.01) |
| ***B01F 3/04*** | (2006.01) |
| ***A23F 3/00*** | (2006.01) |
| ***A23L 2/54*** | (2006.01) |

(52) U.S. Cl.
USPC ........ 222/190; 222/152; 222/481.5; 222/567; 261/76; 261/DIG. 75; 99/323.1

(58) Field of Classification Search
USPC ................ 222/190, 478–479, 567, 569, 152, 222/399; 261/67, DIG. 75; 99/323.1
See application file for complete search history.

(56) References Cited

U.S. PATENT DOCUMENTS

| | | | | |
|---|---|---|---|---|
| 4,595,121 | A * | 6/1986 | Schultz | 222/1 |
| 5,458,165 | A * | 10/1995 | Liebmann, Jr. | 141/64 |
| 5,799,836 | A | 9/1998 | Lee | |
| 6,568,660 | B1 | 5/2003 | Flanbaum | |
| 6,595,109 | B2 * | 7/2003 | Liebmann, Jr. | 99/323 |
| 7,712,637 | B2 * | 5/2010 | Lambrecht | 222/400.7 |
| D640,904 | S | 7/2011 | Wax | |
| 8,033,431 | B2 * | 10/2011 | Sommerfield et al. | 222/152 |
| 8,128,086 | B2 * | 3/2012 | Obuchi | 271/221 |
| 8,205,541 | B2 * | 6/2012 | Barberio et al. | 99/277.1 |
| 8,245,882 | B1 * | 8/2012 | Federighi | 222/190 |
| 8,251,352 | B2 * | 8/2012 | Chiorazzi et al. | 261/76 |
| 2008/0290118 | A1 * | 11/2008 | Luzaich et al. | 222/152 |

* cited by examiner

*Primary Examiner* — Paul R Durand
*Assistant Examiner* — Matthew Lembo
(74) *Attorney, Agent, or Firm* — Mark Loen

(57) ABSTRACT

A very compact, stopper style pourer that can be inserted in a wide range of container neck sizes. The above mentioned end stopper is multifunctional, combining pouring, aeration, provision for preservation and capping in an integrated innovative design. The pourer is equipped with an internal aeration system, based on the Venturi principle, a non-protruding, non-drip spout, built inside the stopper, an access opening for a preserving gas supply, a telescopic extension in the container that regulates the aeration and improves the preserving gas usage. The stopper is also fitted with a hinged lid that has a co molded seal and lock, to provide a positive capping. The front face of the lid is suitable in size to carry any logo/marking, similar to any wine container cork-sleeve.

6 Claims, 4 Drawing Sheets

Section A-A

COMBINATION AERATOR, POURER, PRESERVER, AND STOPPER FOR A CONTAINER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1) Field of the Invention

This invention is directed at in-container liquid preservation systems, with enhanced personal convenience features to provide adjustable aeration during pouring and a complete stopper system for the container to improve usefulness in a variety of applications and situations. It additionally incorporates the capability to use an inert gas to preserve the liquid by the preventing contact with oxygen during storage.

(2) Description of Related Art

Typically, for elegant wine serving, it is desirable to provide instantaneous aeration during the pouring operation, with the added functionality for preserving and capping the un-poured contents of the container. Common places where such situations arise are: households, restaurants, and bars where wine is sold.

It is desirable to aerate wine before it is served, that is, to allow air to filter into the liquid even though contact with oxygen is undesirable for long term storage. Many wine enthusiasts recommend that aeration improves the taste of the wine, making it smoother by allowing contact with oxygen where certain components in the wine can be oxidized.

In contrast, during storage, it is desirable to prevent contact between the liquid and oxygen. For example, prolonged exposure to oxygen causes oxidation and allows a microbe found in wine to start converting the ethyl alcohol in the wine into acetic acid—which is the main component of vinegar. The wine taste is then degraded or lost. There are similar problems with other fluids.

Aeration can be performed by pouring the wine into a decanter and letting it stand for an hour or two. An alternate method, as taught herein, is by a forced aeration method which is done while the wine is being poured into a glass, and is much faster.

Decanting is an undesirable, inconvenient extra step in the serving process due to the delay required between pouring and actually consuming the wine. Aeration methods used by others in many cases require very cumbersome equipment and the use of two hands. The desire for improved pouring out of a container needs special attention or a separate pouring stopper. Storage preservation is not a handy process and capping is not easy, especially with the original cork.

Aerators do currently exist on the market, however other equipment is required to perform other functions such as pouring or preservation which is inconvenient. Other aerators are inserted into the end of a bottle/container and have undesirably long protruding spouts to assure aeration and pouring, such as U.S. Pat. No. 6,568,660.

A simple storage method for the preservation of wine can be provided by injecting an inert gas that displaces the air in an open container and attempting to insert the original cork back into the end of the bottle/container. This is undesirable due to the awkward nature of fitting the old cork back into the container which allows oxygen back into the container.

Nitrogen is the preferred inert gas for wine storage because of its low solubility in wine, and its affordability. Alternate gases used for preservation are argon, carbon dioxide, and helium. These gases are available commercially in substantially pure forms in aerosol or similar containers, and readily purge oxygen from the container.

Another method of storage is to put a stopper in the container with a small center tube insert and then pump out the air at the top of the container. This prevents contact with oxygen. Commercial systems are available today for this which include a hand pump and end container stopper. This is less desirable because the vacuum is often partial, and can be difficult to maintain.

There are some partial efforts by others to address issues with pouring, preservation, and aeration. Some typical examples follow.

U.S. Pat. No. 6,568,660 by Flanbaum describes a pourer device for simultaneously pouring a liquid from a container and mixing air into the liquid. Though an opening is designed for air suction, which provides for aeration, the location of the air suction point is at the venturi restriction point which causes the aeration to be turbulent, requiring the use of baffles or a screen downstream of the venturi. This, in turn, causes the pouring of the wine to have a sloppy characteristic, and undesirable.

U.S. Pat. No. D640,904 by Wax shows an aerator that is more of a decanter approach. Wine is poured into a container which is then poured into a glass. However, this design is only somewhat better aeration than simply pouring a glass of wine, as the improved contact with air is marginal.

U.S. Pat. No. 5,799,836 by Lee is a dispensing device for a bottle designed to pour out liquid smoothly in a metered manner, and additionally trap particles. It contains a cap to provide sealing after use. It is lacking in design features for aeration.

The above references highlight the fact that though individual components can be found in an end stopper or end of container device, it is difficult to combine multiple features into one single satisfactory device for the end of a container. The desire for aeration, the need to remove oxygen from a container for storage, to pour satisfactory, to provide effective sealing, to provide for sanitation, to design for convenience and elegance while entertaining is a difficult challenge. The opening in a container is small, and the ability to provide an economical solution to the problems also makes the task difficult.

A technical solution which could be made from plastic in a mold injection machine, with a minimum of assembly and packaging, would be an affordable economic-business solution to lend itself to being used among multiple containers that have been opened. It is also desirable that the assembly is easily cleanable, preferably in a soapy water solution or dishwasher.

There is a need in the marketplace to provide for an aerator, pourer, preserver, with a cap for sealing that is all combined in a single design that lends itself to mass production with economic scale that allows use on multiple containers after they are opened. Additionally, it is desirable to provide a design that requires little or no training for an individual for safe use.

BRIEF SUMMARY OF THE INVENTION

The present invention combines all of the above in a compact, reusable end stopper that aerates instantaneously during pouring into the glass, provides a clean poor without dripping, and provides for satisfactory inert gas preservation. The hinged lid assures an airtight seal after the preserving gas is injected. The lid of the stopper in this invention is also suitable for customized marking, and conforms to the shape of a common wine container cork.

The present invention combines all of the above: poring, aeration, preserving capability and easy capping in a non-protruding, small, collapsible, transportable, reusable device. The device is designed for convenience, elegance in design, and mass production by being designed to be produced in a mold injection machine.

BRIEF DESCRIPTION OF THE SEVERAL VIEWS OF THE DRAWING(S)

DETAILED DESCRIPTION OF THE INVENTION

Figure 1:
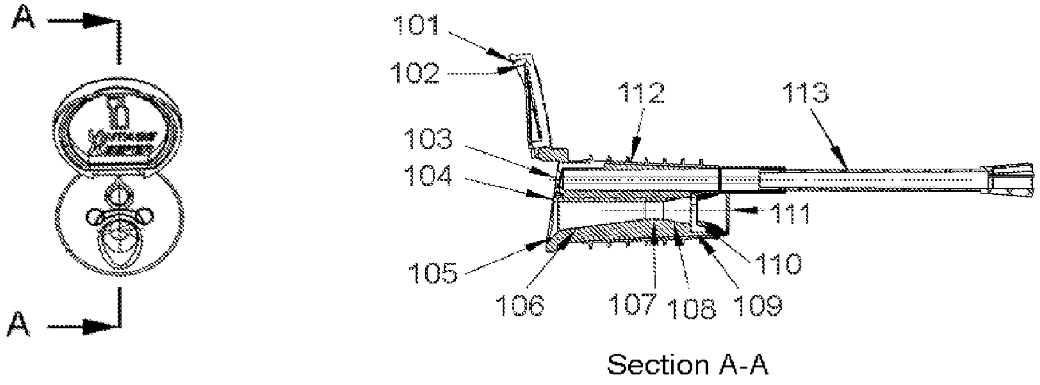
FIG. 1 shows the main components of the presented invention.

As seen in FIG. 1, the combination device comprises a tapered round body, shaped like a conical frustum, fitted on the outside with a with a soft elastomer/rubber seal ribbing 112 to provide a good seal for a wide range of containers. At the top (large circle of the conical frustum at the exit of the venturi) of the combination device an elongated pouring lip 105 is used to dispense the fluid (i.e. wine) and a hinged lid 102 is attached which, in this embodiment includes a seal and a snap lock 101. Alternately, the seal is inserted separately when the lid is closed, or is located on the conical frustum. As is shown, it is suitable for a container stopper and can be made from a mold injectable material, such as a plastic or elastomer.

For fluid preservation, an inert preserver gas canister supply port 103 is used to connect an inert gas for preserving the contents of the container. Also, a telescopic extension 113 protrudes from the right (small circle of the conical frustum) of the combination device to assist in purging oxygen from the container, with additional functionality to be described in another paragraph. The telescopic extension length is adjusted to the desired length and firmly locked by a twist lock mechanism. It could be also locked in length by another method such as by mechanical threads, a ratchet action on a ribbed surface, an interference fit (i.e. 'tight fit') that slides under a moderate force, or possibly an accordion type extension which collapses/expands in length to fixed incremental lengths.

In line aeration takes place inside the combination device, and is totally hidden from the view of the user. The aeration is based on a vacuum version of the Venturi principle using the liquid flow from the container during pouring to create a vacuum and draw in air. To improve and simplify the aeration, aeration lines are ported 104 from the front face of the combination device to an aerator ring/vacuum chamber 109 which eliminates any danger of spilling liquid sideways, as possible with related art methods. The telescopic extension 113 is used to regulate the amount of vacuum by regulating the length of extension, which controls the inlet air flow rate, and in turn, the liquid through the liquid inlet 111 to the venturi nozzle 110 and through the diverging outlet 106. By regulating the liquid flow, the amount of aeration is controlled. Air enters the container through the telescopic extension rather than through the diverging outlet because it is the path of least resistance during the pouring operation.

The wine flow and aeration is additionally controlled by the aeration/air flow design. By using a venturi, based on Bernoulli's law, a pressure differential is generated by the speed of the fluid through the venturi throat 107 which creates a vacuum at the aeration ring (vacuum chamber) 109 which is placed upstream of the venturi converging inlet 108 and downstream of the fluid entry nozzle 110. Air is then draw in through the aeration ports 104 and enters the fluid stream through the vacuum chamber 109 to be mixed in the fluid stream—to aerate it. The aerated mix is discharged through the diverging outlet diffuser. The aerated wine leaves the combination device smoothly through the well-shaped elongated pouring lip 105 which is larger than the venturi diverging outlet 106. To maintain pressure balance in the bottle, air constantly enters from the front port via the telescopic air supply channel 113 to balance the loss of fluid.

The size and gap of the aeration/vacuum chamber 109 is designed to be well balanced so as to provide a smooth pour at a convenient rate, without any spillage, with the ideal aeration ratio. The gap around the venturi converging inlet and the fluid entry nozzle is an important embodiment of the present invention.

Figure 2:
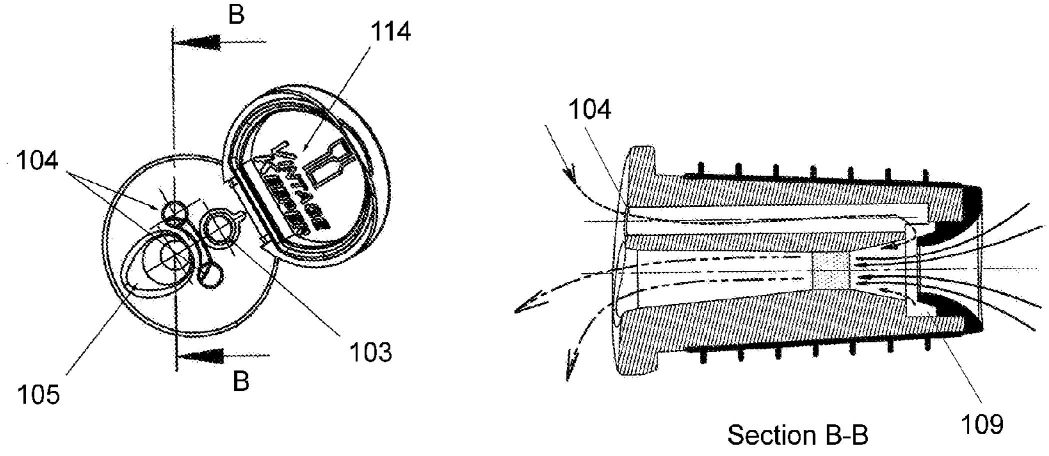
FIG. 2 shows the innovative channeling of the aeration ports from the front surface to the vacuum chamber.

FIG. 2 is a cross section through the combination device and aeration pathway (without the telescopic extension). The top view on the left indicates the inert gas canister port 103, aeration ports 104, pouring lip 105, and company logo 114 on the lid. As previously mentioned, the inert gas canister port 103 has a dual function; it serves as the inlet for the preserving gas dispensing canister and also as the air entry port inlet to the container during pouring when aerating the wine. As shown in the top view, the lid can be decorated internally with a logo, marking, or instructions, which are revealed when the lid is opened.

Figure 6:
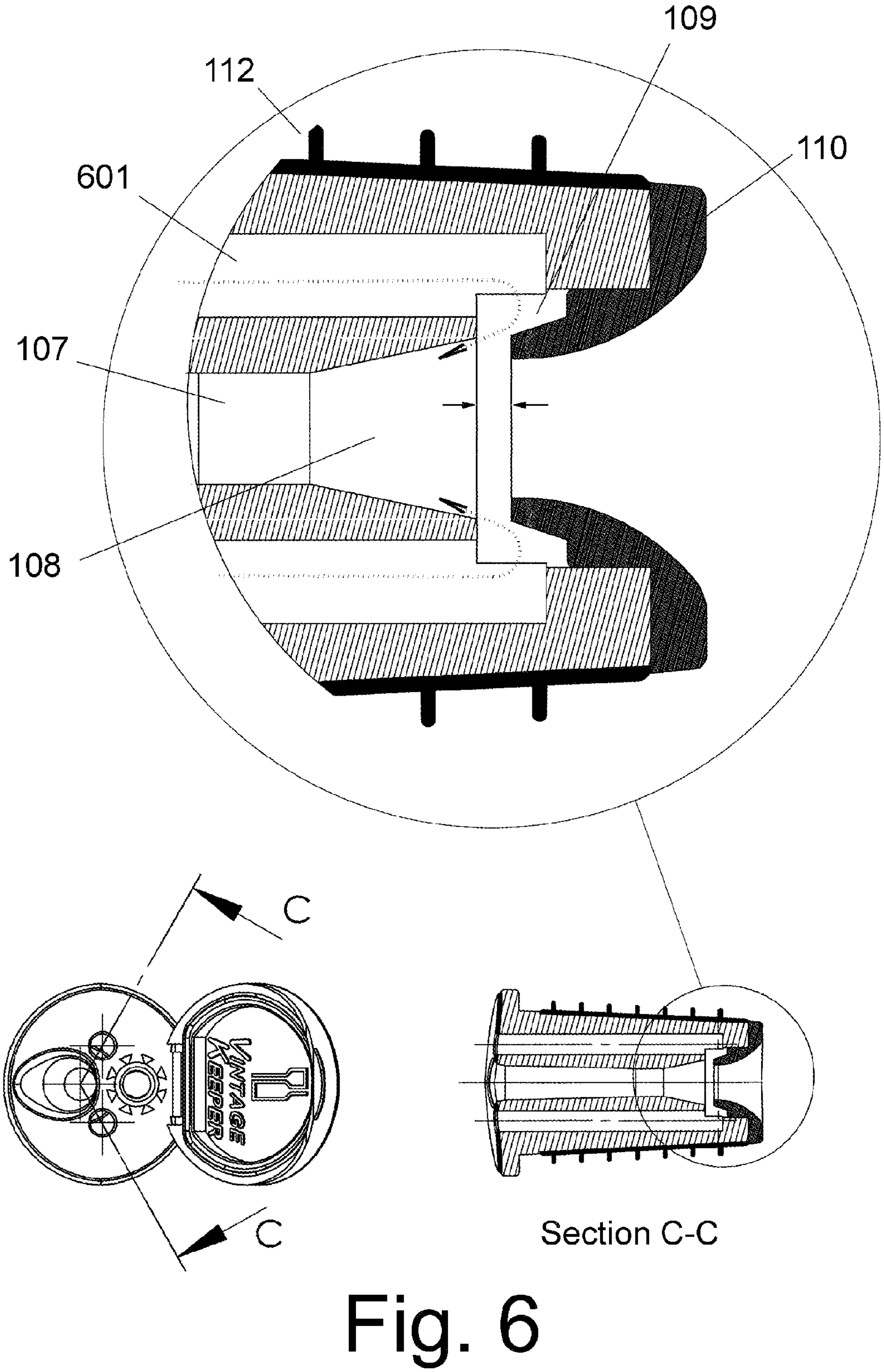
FIG. 6 shows a close up detail of the vacuum chamber.

In the presented embodiment shown in FIGS. 1-2, a typical liquid bottle, such as a wine bottle, would use the following typical dimensions:

a) The large circle of the conical frustum would be in the range of ¾" to 1" in diameter
b) Venturi throat (107) diameter would be in the range of ⅛" to 3⁄16", and a length of ⅛" to ¼"
c) Aeration line (104) diameters would be in the range of 1⁄16" to ⅛"
d) Overall length of the venturi assembly without the telescopic extension: range of 1¼" to 1¾" in length
e) Telescopic extension adjustable range of ¾" to 3" in length
f) Fluid nozzle (111) inlet diameter range of ½" to ⅝"
Vacuum chamber's (109) clearance or gap, as measured in-between the
g) liquid nozzle (110) outlet and the entry of the venturi (108)—range of 1⁄32" to 1⁄16" (horizontal dimension as shown in FIG. 6 detail)

The ranges above would be understood to include the end-point values.

Figure 3:
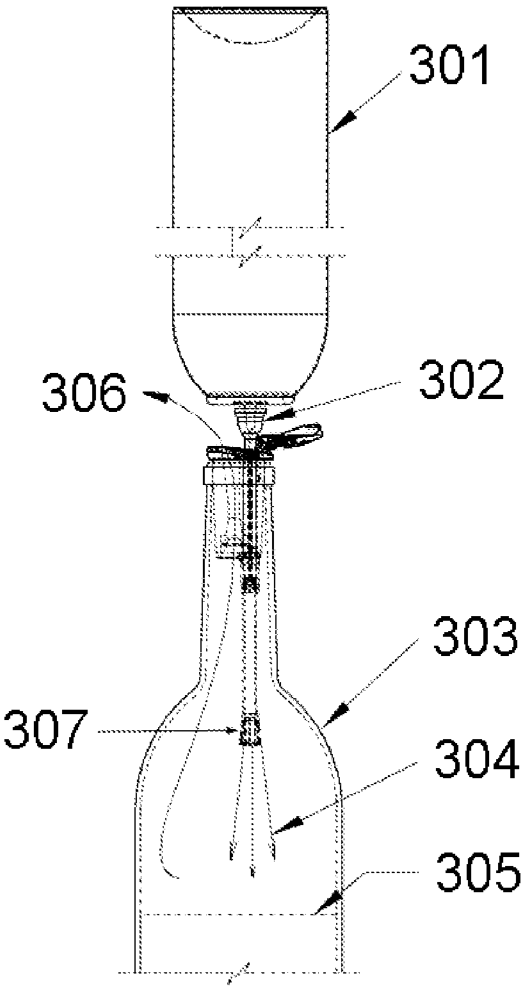
FIG. 3 shows the preserving method where a canister of inert gas is used to inject a layer of preserving gas and dislocate the air from the top of the container of liquid.

FIG. 3 shows how the combination device is used to initiate the preservation process. A gas canister 301 pressurized with an appropriate inert gas used for wine preservation (often nitrogen), is pressed against the chamfered "preserving gas supply port" with an appropriate fitting 302. Pressing the canister down, the valve of the canister opens, (similar to any common aerosol dispensing can) and the dispensed gas 304 enters with pressure into the container 303 through the telescopic supply channel of the device. The telescopic channel preferably ends with a conical diffuser 307 that assures an even distribution of the gas in the container 303. The air that was previously in contact with the wine 305 is displaced by the injected gas, and is exhausted out 306 through the pouring lip. As soon as this process is completed, the cap/lid can be immediately flipped and the container will be capped with the preserving gas trapped inside. Due to the hinged lid this maneuver can be done easily by one person, without any danger of knocking over a container in a rush to grab a cork or a separate stopper.

Figure 4:
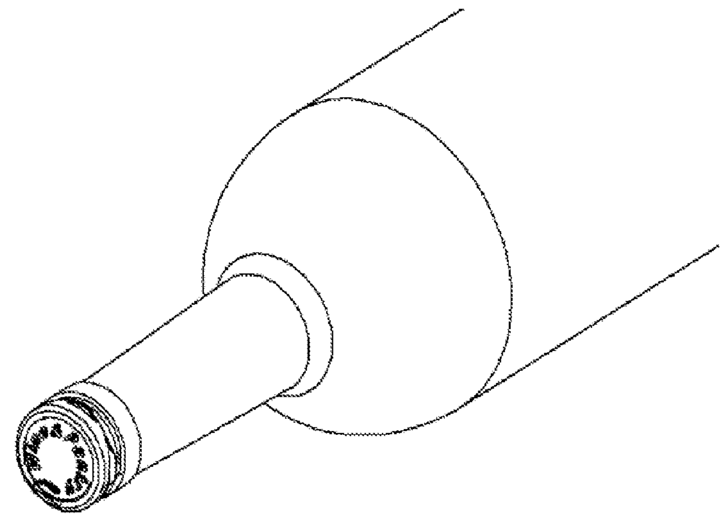
FIG. 4 shows the how the container is capped by a hinged cap/lid.

FIG. 4 shows how the combination device will look with the lid closed and locked suggesting it's relative position at the end of a bottle. It also indicates the potential for marking, and customizing.

Figure 5:
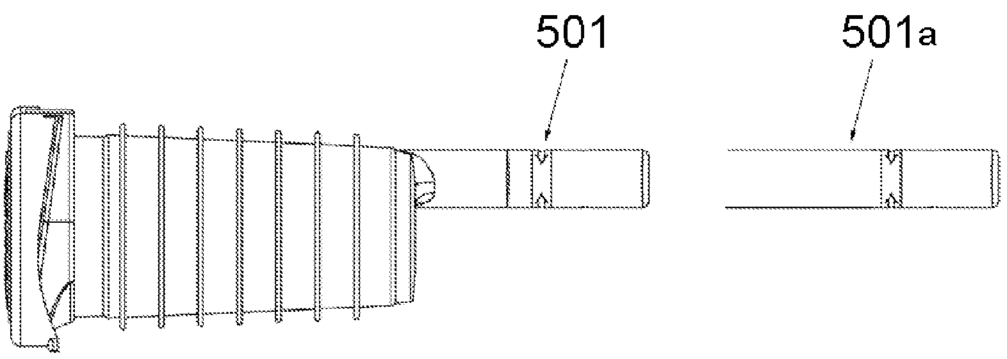
FIG. 5 shows how the combination device will look with the telescoping end fully retracted.

FIG. 5 shows how the combination device will look with the telescoping end 501 fully retracted and locked when removed from the container with the lid closed and locked. The telescoping end is fully extended 501*a* as shown.

FIG. 6 shows a close up detail of the vacuum chamber where the aeration (air) flow meets with the fluid (liquid) flow. As shown, the vacuum chamber 109 is defined by the part assembly and created by providing a distance, i.e. volume, between the fluid nozzle 110 and the entry of the venturi 108. This allows the aeration to be drawn through aeration line(s) 601 into the venturi. When designed in this manner through the use of the fluid nozzle 110 and venturi, the aeration flow moves correctly into the liquid flow and liquid does not move out of the stopper through the aeration line(s) 601. The geometry of the vacuum chamber is defined by the assembly of the two individual sub-parts containing the fluid nozzle and the venturi.

In conclusion, this all in one device is ideal for pouring, with simultaneous aeration of wine, lends itself to preservation of the wine in an open container and acts as an airtight lid that is markable for identification. All materials used for this product are made from food grade materials, dishwasher safe plastics and elastomers.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

We claim:

1. A multipurpose combination end stopper for a container comprising:

a. a stopper comprising:
   i. a conical frustum with a small circle and a large circle,
   ii. wherein said conical frustum is surrounded by a plurality of elastomer ribbing for the purpose of fitting inside an opening of said container to seal said opening,
   iii. a hinged lid attached to said large circle with an associated seal,
   iv. wherein said conical frustum is made from a mold injectable material,
b. an in-line aerator for liquid flow from said container comprising:
   i. wherein said conical frustum incorporates a Venturi passage for said liquid flow from said container,
   ii. wherein a fluid nozzle and a vacuum chamber are upstream of said Venturi passage,
   iii. wherein at least one aeration line is ported to said vacuum chamber,
   iv. wherein said at least one aeration line passes through said conical frustum and terminates at an at least one aeration port on said large circle,
c. a pourer comprising:
   i. an elongated lip incorporated into said conical frustum at the exit of said Venturi passage, and,
d. a liquid preservation system comprising:
   i. an inert gas canister port with an associated air passageway through said conical frustum, adapted to receive a preserving gas dispenser canister and serve as an air entry port during pouring,
   ii. an extensible tube connected to said air passageway at said small circle,
   iii. said hinged lid useful to seal said container,
   iv. wherein said inert gas canister port is designed for a preserving gas flow of an inert gas, wherein said multipurpose end stopper is useful for sealing a container, aerating its contents during pouring, and preserving its contents for storage.

2. A multipurpose combination end stopper according to claim 1 wherein said vacuum chamber is a geometric volume between said fluid nozzle and said venturi.

3. A multipurpose combination end stopper according to claim 1 wherein said extensible tube is fixed in length by a rotation relative to said end stopper.

4. A multipurpose combination end stopper according to claim 1 wherein said ribbing is made from a flexible elastomer.

5. A multipurpose combination end stopper according to claim 1 wherein said inert gas is at least one from the group consisting of:

i) nitrogen,
ii) carbon dioxide,
iii) argon, and
iv) helium.

6. A multipurpose combination end stopper according to claim 1, wherein:

a. said Venturi passage has a throat with a diameter between 1/8 to 3/16 inches inclusive and said throat is between 1/8 to 1/4 inches in length inclusive,
b. said fluid nozzle has an inlet diameter between 1/2 to 5/8 inches inclusive, and
c. said vacuum chamber as measured between the exit of said fluid nozzle and the entry of said at least one aeration line is between 1/32 to 1/16 inches inclusive.

* * * * *